United States Patent
Zhang

(10) Patent No.: US 11,090,918 B2
(45) Date of Patent: Aug. 17, 2021

(54) LABEL MANUFACTURING METHOD AND SELF-LAMINATING LABEL

(71) Applicant: CHONGQING WANCAI PRINTING CO., LTD., Chongqing (CN)

(72) Inventor: Yi Zhang, Chongqing (CN)

(73) Assignee: CHONGQING WANCAI PRINTING CO., LTD., Chongqing (CN)

( * ) Notice: Subject to any disclaimer, the term of this patent is extended or adjusted under 35 U.S.C. 154(b) by 39 days.

(21) Appl. No.: 16/336,097

(22) PCT Filed: Sep. 26, 2016

(86) PCT No.: PCT/CN2016/100095
§ 371 (c)(1),
(2) Date: Mar. 22, 2019

(87) PCT Pub. No.: WO2018/053832
PCT Pub. Date: Mar. 29, 2018

(65) Prior Publication Data
US 2019/0224953 A1    Jul. 25, 2019

(51) Int. Cl.
*B32B 3/14*    (2006.01)
*B32B 7/06*    (2019.01)
(Continued)

(52) U.S. Cl.
CPC .............. *B32B 37/02* (2013.01); *B32B 3/14* (2013.01); *B32B 7/06* (2013.01); *B32B 37/18* (2013.01);
(Continued)

(58) Field of Classification Search
CPC ........ B31D 1/026; B31D 1/021; B31D 1/022; G09F 2003/0222; G09F 3/02; G09F 3/10;
(Continued)

(56) References Cited

U.S. PATENT DOCUMENTS 4,951,970 A * 8/1990 Burt ................. B31D 1/027
283/67
5,230,938 A * 7/1993 Hess ................ G09F 3/02
283/79
(Continued)

FOREIGN PATENT DOCUMENTS

CN    200962278 Y    10/2007
CN    101151645 A    3/2008
CN    204242514 U    4/2015

OTHER PUBLICATIONS

International search report of PCT Patent Application No. PCT/CN2016/100095 dated May 24, 2017.

*Primary Examiner* — Patricia L. Nordmeyer

(57) ABSTRACT

A label manufacturing method includes: a cladding material manufacturing step, including: manufacturing adhesive, a release film including a base material and a surface material, and a transparent film into a cladding material, wherein a first side of the cladding material includes the base material of the release film, the transparent film, and the surface material of the release film, and a second side of the cladding material includes the adhesive and the surface material of the release film, and the first side and the second side are two sides of the cladding material which are side by side; and, a label die cutting step, including die cutting the transparent film and the base material of the release film at the first side of the cladding material into a first label unit, and die cutting the adhesive at the second side of the cladding material into a second label unit.

5 Claims, 8 Drawing Sheets

(51) Int. Cl.
*G09F 3/02* (2006.01)
*G09F 3/10* (2006.01)
*B32B 7/12* (2006.01)
*B32B 37/02* (2006.01)
*B32B 37/18* (2006.01)
*B32B 38/00* (2006.01)

(52) U.S. Cl.
CPC ............ *B32B 38/0004* (2013.01); *G09F 3/02* (2013.01); *G09F 3/10* (2013.01); *B32B 7/12* (2013.01); *B32B 2307/412* (2013.01); *B32B 2405/00* (2013.01); *B32B 2519/00* (2013.01); *G09F 2003/0222* (2013.01); *Y10T 428/1476* (2015.01)

(58) Field of Classification Search
CPC ... Y10T 428/1476; B32B 37/02; B32B 37/18; B32B 27/08; B32B 27/10; B32B 3/14; B32B 7/06; B32B 38/0004; B32B 2307/412; B32B 2405/00; B32B 2519/00; B32B 7/12
See application file for complete search history.

(56) References Cited

U.S. PATENT DOCUMENTS

| | | | | |
|---|---|---|---|---|
| 5,662,976 | A * | 9/1997 | Popat | B32B 38/00 283/101 |
| 6,685,228 | B2 * | 2/2004 | Riley | G09F 3/0288 283/101 |
| 6,863,311 | B2 * | 3/2005 | Riley | G09F 3/0288 283/101 |
| 9,852,661 | B2 * | 12/2017 | Li | G09F 3/10 |
| 10,262,561 | B2 * | 4/2019 | Li | B32B 27/08 |
| 2003/0001381 | A1 * | 1/2003 | Riley | G09F 3/0288 283/101 |
| 2004/0091659 | A1 * | 5/2004 | Banks | G07F 17/26 428/41.8 |
| 2006/0233994 | A1 * | 10/2006 | Hodsdon | B32B 7/04 428/40.1 |
| 2009/0022926 | A1 * | 1/2009 | Dangami | G09F 3/02 428/42.2 |
| 2011/0262674 | A1 * | 10/2011 | Cunningham | G09F 3/207 428/41.6 |
| 2015/0279242 | A1 * | 10/2015 | Parks | G09F 3/10 428/41.7 |

\* cited by examiner

| Manufacturing adhesive, a release film and a transparent film into a cladding material, wherein a first side of the cladding material comprises a base material of the release film, a transparent film and a surface material of the release film which are sequentially laminated, and a second side of the cladding material comprises the adhesive and the surface material of the release film which are subsequently laminated | S11 |

| Die cutting the transparent film and the base material of the release film at the first side of the cladding material into a first label unit, and die cutting the adhesive at the second side of the cladding material into a second label unit, wherein the first label unit and the second label unit are symmetrically distributed along a reference line on the surface material of the release film | S12 |

FIG. 1

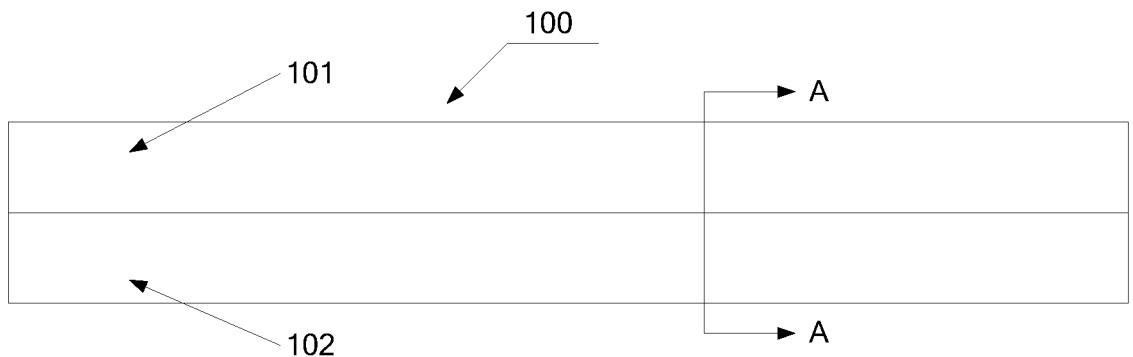

FIG. 2

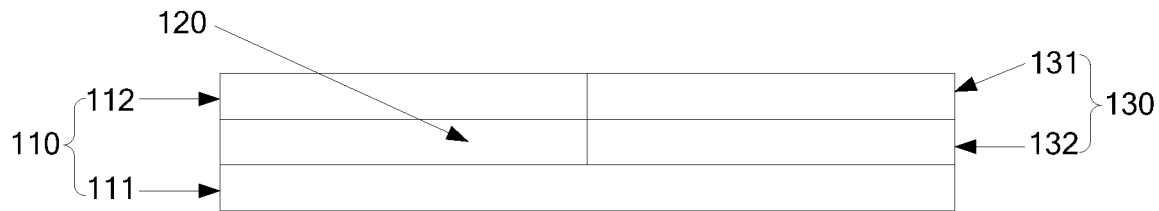

FIG. 3

Manufacturing adhesive, a release film, and a transparent film into a cladding material, wherein a first side of the cladding material comprises a base material of the release film, the transparent film and a surface material of the release film which are sequentially laminated, and a second side of the cladding material comprises adhesive and the surface material of the release film which are sequentially laminated ⎯S21

Die cutting the transparent film and the base material of the release film at the first side of the cladding material into a first label unit, and die cutting a surface material of the adhesive at the second side of the cladding material into a second label unit, wherein the first label unit and the second label unit are symmetrically distributed along a reference line on the surface material of the release film ⎯S22

FIG. 11

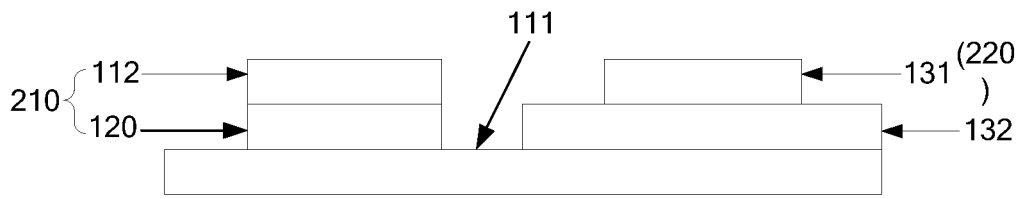

FIG. 12

| Manufacturing adhesive, a release film and a transparent film into a cladding material, wherein a first side of the cladding material comprises a base material of the release film, the transparent film and a surface material of the release film which are sequentially laminated, and a second side of the cladding material comprises the adhesive and the surface material of the release film which are sequentially laminated | ⟶ S31 |

↓

| Die cutting the base material of the release film and the transparent film at the first side of the cladding material into a first label unit, and die cutting the adhesive at the second side of the cladding material into a second label unit, wherein the first label unit and the second label unit are symmetrically distributed along a reference line on the surface material of the release film | ⟶ S32 |

↓

| Removing the base material of the release film of the first label unit, folding the cladding material in half along the reference line to laminate the first label unit and the second label unit, and removing the surface material of the release film | ⟶ S33 |

FIG. 13

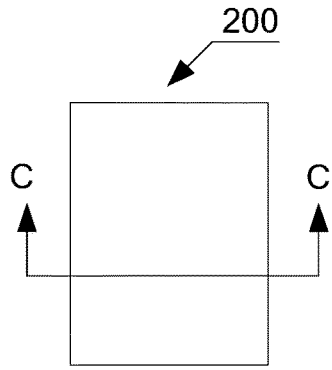

FIG. 14

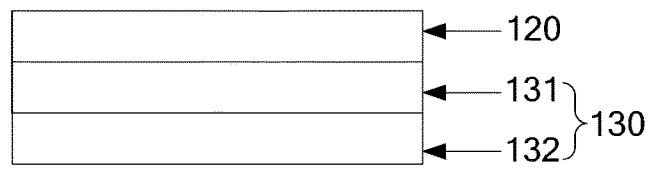

FIG. 15

```
┌─────────────────────────────────────────────────────────────────┐
│  Manufacturing adhesive, a release film and a transparent film  │
│  into a cladding material, wherein a first side of the cladding │
│  material comprises a base material of the release film, the    │
│  transparent film and a surface material of the release film    │─── S41
│  which are sequentially laminated, and a second side of the     │
│  cladding material comprises adhesive and the surface material  │
│  of the release film which are sequentially laminated           │
└─────────────────────────────────────────────────────────────────┘
                                │
                                ▼
┌─────────────────────────────────────────────────────────────────┐
│  Die cutting the transparent film and the base material of the  │
│  release film at the first side of the cladding material into a │
│  first label unit, and die cutting the surface material of the  │
│  adhesive of the second side of the cladding material into a    │─── S42
│  second label unit, wherein the first label unit and the second │
│  label unit are symmetrically distributed along a reference line│
│  on the surface material of the release film                    │
└─────────────────────────────────────────────────────────────────┘
                                │
                                ▼
┌─────────────────────────────────────────────────────────────────┐
│  Removing the base material of the release film of the first    │
│  label unit, folding the cladding material in half along the    │
│  reference line to laminate the first label unit and the second │─── S43
│  label unit, and removing the surface material of the release   │
│  film and the base material of the adhesive                     │
└─────────────────────────────────────────────────────────────────┘
```

FIG. 16

```
┌─────────────────────────────────────────────────────────────────┐
│  Manufacturing adhesive, a release film, a transparent film and │
│  an anti-counterfeiting material into a cladding material,      │
│  wherein a first side of the cladding material comprises a base │
│  material of the release film, the transparent film, the anti-  │
│  counterfeiting material and a surface material of the release  │─── S51
│  film which are sequentially laminated, and a second side of    │
│  the cladding material comprises the adhesive and the surface   │
│  material of the release film which are sequentially laminated  │
└─────────────────────────────────────────────────────────────────┘
                                │
                                ▼
┌─────────────────────────────────────────────────────────────────┐
│  Die cutting the base material of the release film, the         │
│  transparent film and the anti-counterfeiting material at the   │
│  first side of the cladding material into a first label unit,   │
│  die cutting a surface material of the adhesive at the second   │─── S52
│  side of the cladding material into a second label unit, wherein│
│  the first label unit and the second label unit are             │
│  symmetrically distributed along a reference line on the surface│
│  material of the release film                                   │
└─────────────────────────────────────────────────────────────────┘
```

FIG. 17

Manufacturing adhesive, a release film, a transparent film and an anti-counterfeiting material into a cladding material, wherein a first side of the cladding material comprises a base material of the release film, a transparent film and a surface material of the release film which are subsequently laminated, and a second side of the cladding material comprises the adhesive and the surface material of the release film which are sequentially laminated, and a third side of the cladding material comprises the anti-counterfeit material and the surface material of the release film which are sequentially laminated ⟶ S61

Die cutting the transparent film and the base material of the release film at the first side of the cladding material into a first label unit, die cutting the surface material of the adhesive at the second side of the cladding material into a second label unit, and die cutting the anti-counterfeiting material at the third side of the composite material into a third label unit, wherein the first label unit and the second label unit are symmetrically distributed along a first reference line on the surface material of the release film, and the second label unit and the third label unit are symmetrically distributed along a second reference line on the surface material of the release film ⟶ S62

FIG. 18

LABEL MANUFACTURING METHOD AND SELF-LAMINATING LABEL

TECHNICAL FIELD

The present invention relates to a technical field of machinery, and, in particular, to a label manufacturing method and a self-laminating label.

BACKGROUND

Most labels have layers of glue at back sides, which are also called as stickers. Compared to a traditional label, the sticker has the advantages of no need to brush glue, no need to use paste, no need to dip water, no pollution, saving labeling time, and so on. It has a wide application range and is convenient and fast to use. The sticker is a kind of cladding material which uses a surface material made of paper, film or any other special material, and an adhesive back side, and base paper in a form of silicone protective paper. After the processing of printing, die cutting etc., the cladding material becomes a finished sticker.

The adhesive of the sticker used in ink-jet printing, laser printing, thermal transfer printing, and thermal printing must be treated with a special surface laminating layer that is affected by temperature during the printing and is prone to chemical changes. After a long-term exposure in the air, there will be a phenomenon such as a blurred pattern, powder drops in the surface laminating layer.

The current solution mainly avoids the above phenomenon by laminating a transparent film layer on the printed adhesive to prevent the printed pattern on the adhesive from being exposed to the air. The existing laminating techniques mainly include "cold laminating", "over-molding", "filming", etc. These methods require a dedicated laminating device and have special requirements on the size of the material. As a result, a device cost, a processing cost, and a material selection cost are high, and the production cost of the label is increased.

SUMMARY

Technical Problem

A main object of embodiments in the present invention is to provide a label manufacturing method and a self-laminating label, which are intended to reduce the production cost of the label.

Solution of the Problem

To achieve the above object, a label manufacturing method is proposed, and the method comprises the following steps:

a cladding material manufacturing step, comprising: manufacturing adhesive, a release film including a base material and a surface material, and a transparent film having a viscous side into a cladding material, wherein a first side of the cladding material comprises the base material of the release film, the transparent film, and the surface material of the release film which are subsequently laminated, and a second side of the cladding material comprises the adhesive and the surface material of the release film which are subsequently laminated, and the first side and the second side are two sides of the cladding material which are side by side; and, a label die cutting step, comprising: die cutting the transparent film and the base material of the release film at the first side of the cladding material into a first label unit, and die cutting the adhesive at the second side of the cladding material into a second label unit, wherein the first label unit and the second label unit are symmetrically distributed along a reference line on the surface material of the release film.

Further, the cladding material manufacturing step specifically comprises:

determining the first side and the second side on the release film;

peeling off the base material at the first side of the release film to expose the surface material, laminating the transparent film on the surface material, and then laminating the base material on the transparent film; and, removing the base material at the second side of the release film to expose the surface material, and laminating the adhesive on the surface material.

Further, after the step of determining the first side and the second side on the release film, the method further comprises: die cutting, between the first side and the second side of the release film, the base material of the release film into two separate parts.

Further, the label die cutting step further comprises: die cutting for a tear line along the reference line.

Further, the reference line is a center line on the surface material of the release film.

Further, the number of the first label unit and the second label unit are more than one, and the label die cutting step further comprises: cutting the cladding material into a plurality of cladding materials, each of the cladding materials after being cut comprises at least one pair of the first label units and the second label unit.

Further, the adhesive comprises a base material and a surface material, and die cutting the adhesive at the second side of the cladding material into the second label unit comprises:

die cutting the surface material and the base material of the adhesive at the second side of the cladding material into the second label unit; or die cutting the surface material of the adhesive at the second side of the cladding material into the second label unit.

Further, die cutting the transparent film and the base material of the release film at the first side of the cladding material into the first label unit comprises:

die cutting, from the surface of the base material of the release film, the transparent film and the base material of the release film at the first side of the cladding material into the first label unit having a pull bar; and, die cutting from surface of the surface material of the release film in order to cut off the pull bar of transparent film of the first label unit.

Further, the step of cutting off the pull bar of the transparent film of the first label unit comprises: cutting off, from a root position of the pull bar, the pull bar of the transparent film of the first label unit.

Further, after the label die cutting step, the method further comprises:

a label laminating step of removing the base material of the release film of the first label unit, folding the cladding material along the reference line in half to laminate the first label unit and the second label unit together, and removing the surface material of the release film.

The present invention also proposes a self-laminating label comprising a surface material of a release film, and a first label unit and a second label unit which are laminated on the surface material of the release film side by side and symmetrically distributed along a reference line on the surface material of the release film, wherein the first label unit comprises a base material of the release film and a transparent film which are sequentially laminated from top to bottom, and the second label unit comprises:

a surface material of adhesive, and a base material of adhesive exists between the surface material of the release film and the second label unit; or, the surface material and the base material of the adhesive which are laminated in order from top to bottom.

Further, the reference line is a tear line.

Further, the reference line is a center line on the surface material of the release film.

Further, the release film of the first label unit has a pull bar on the base material.

Advantageous Effects

In the label manufacturing method provided by embodiments of the present invention, the cladding material having different structures on both sides is manufactured firstly, and then the both sides of the cladding material are respectively die cut to form the first label unit and the second label unit symmetrically distributed along the reference line on the surface material of the release film, wherein the first label unit has the transparent film, and the second label unit is the adhesive, thereby obtaining a self-laminating label, and only folding the self-laminating label in half along the reference line and making the two parts after the folding contact with each other are needed when the label laminating is carried out subsequently. Since the first label unit and the second label unit are symmetrically distributed along the reference line, the transparent film of the first label unit and the adhesive of the second label unit after the folding can be completely and accurately aligned and laminated, and the entire laminating process is highly efficient and fast without the need of the special laminating device for a laminating operation and a special requirement of material size, thus reducing the device cost, the processing cost and the material selection cost, which greatly reduces the production cost of the label.

BRIEF DESCRIPTION OF THE DRAWINGS

FIG. 1 is a flow chart of a first embodiment of a label manufacturing method in the present invention;

FIG. 2 is a front view of a cladding material in an embodiment of the present invention;

FIG. 3 is a cross-sectional view taken along line A-A of the cladding material in FIG. 2;

FIG. 11 is a flow chart showing a second embodiment of the label manufacturing method in the present invention;

FIG. 12 is a cross-sectional view showing a second embodiment of the self-laminating label in the present invention (i.e., a cross-sectional view taken along line B-B in FIG. 8);

FIG. 13 is a flow chart of a third embodiment of a label manufacturing method in the present invention;

FIG. 14 is a front view of a finished sticker in the embodiment of the present invention;

FIG. 15 is a cross-sectional view taken along line C-C of the sticker in FIG. 14;

FIG. 16 is a flow chart showing a fourth embodiment of the label manufacturing method in the present invention;

FIG. 17 is a flow chart showing a fifth embodiment of the label manufacturing method in the present invention;

FIG. 18 is a flow chart showing a sixth embodiment of the label manufacturing method in the present invention.

Figure 4:
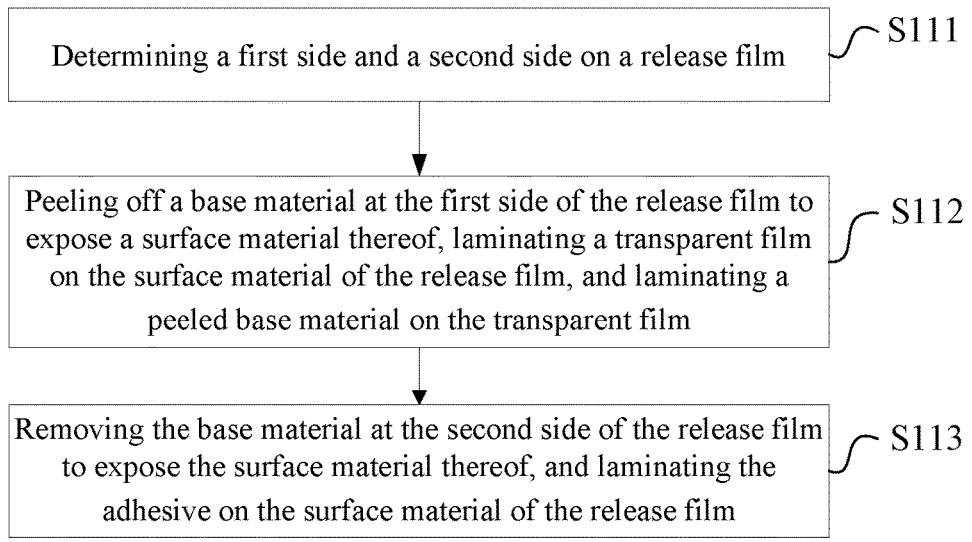
FIG. 4 is a detailed flow chart of a cladding material manufacturing step in an embodiment of the present invention.

The implementation, functional features, and advantages of the present invention will be further illustrated with reference to the accompanying drawings.

DESCRIPTION OF THE EMBODIMENTS

It is understood that the specific embodiments described herein are merely illustrative of the invention and are not intended to limit the invention.

First Embodiment

Referring to FIG. 1, the first embodiment of a label manufacturing method in the present invention is proposed. The label manufactured in this embodiment is a self-laminating label, and the method comprises the following steps:

S11, manufacturing adhesive, a release film and a transparent film into a cladding material, wherein a first side of the cladding material comprises a base material of the release film, a transparent film and a surface material of the release film which are sequentially laminated, and a second side of the cladding material comprises the adhesive and the surface material of the release film which are subsequently laminated.

The step S11 is a cladding material manufacturing step. As shown in FIG. 2 and FIG. 3, release film 110, transparent film 120 and adhesive 130 are manufactured into cladding material 100 having different structures of first side 101 and second side 102 which are side by side (such as, left and right sides which are side by side, upper and lower sides which are side by side).

The adhesive 130 comprises a base material 132 (or base paper) and a surface material 131. The surface material 131 has a viscous side and is bonded to the base material 132. The release film 110 also comprises a base material 112 (or base paper) and a surface material 111. The surface material 111 has a viscous (preferably, weakly viscous) side and is bonded to the base material 112. The transparent film 120 also has a viscous (preferably, weakly viscous) side.

The first side 101 of the cladding material 100, that is, the left side as shown in FIG. 3, comprises the base material 112 of the release film, the transparent film 120 and the surface material 111 of the release film which are subsequently laminated, and the second side, that is, the right side as shown in FIG. 3, comprises the surface material 131 of the adhesive, the base material 132 of the adhesive, and the surface material 111 of the release film which are sequentially laminated.

As shown in FIG. 4, the cladding material manufacturing step S11 specifically comprises the following steps:

S111, determining the first side and the second side on the release film.

Figure 5:
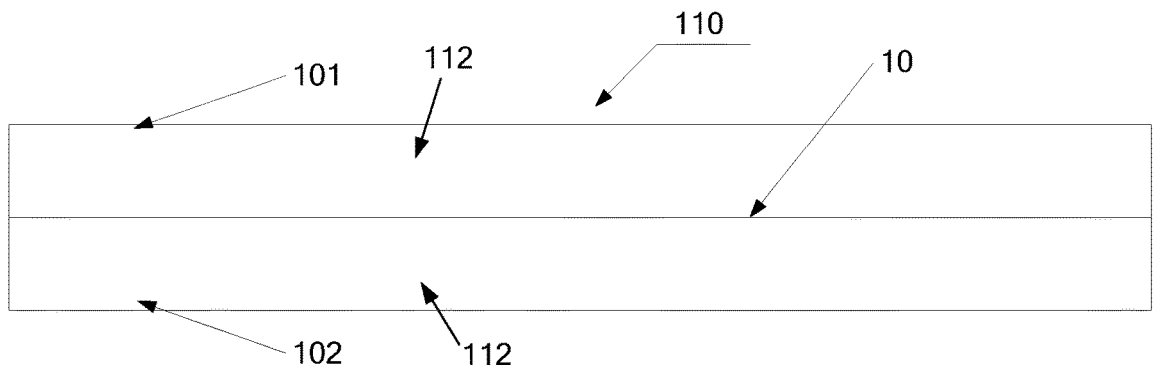
FIG. 5 is a front view of a release film in an embodiment of the present invention.

In the step S111, the release film 110 is firstly die cut to obtain a predetermined dimension, and then the first side 101 and the second side 102 are determined on the release film 110. As shown in FIG. 5, which is an optional structural schematic view of the release film, the release film 110 has an elongated shape (which may also be other shapes), and the upper side shown in the release film 100 can be defined as the first side 101, and the lower side can be defined as the second side 102.

Further, after the first side 101 and the second side 102 are determined, the base material 112 of the release film may be die cut between the first side 101 and the second side 102 of the release film 110 and the base material 112 is cut through so as to die cut the base material 112 of the release film into two separate parts. As shown in FIG. 5, a cutting line 10 divides the base material 112 of the release film into the upper and lower parts as shown. Thereby, it is convenient to subsequently peel off the base material 112 of the release film at the first side 10 and the second side 20, respectively.

In the embodiment of the present invention, the release film 110 refers to a film which is distinguishable on the surface of the film, and the release film 110 is not viscous or is weakly viscous after contact with a specific material under a limited condition. The release film 110 is also called a peeled film, a separation film, an isolation film, a resist film, a release film, a film, a plastic film, a mask film, a silicone film, a silicone paper, an anti-adhesive film, paper, a slip film, Tianna (in Pinyin) paper, release paper, etc.

It should be understood that, in addition to the release film 110, other films having a double-layer weakly viscous and removable form may be equivalently used instead, and are equally within the scope of the present invention.

S112, peeling off the base material at the first side of the release film to expose the surface material thereof, laminating the transparent film on the surface material of the release film, and laminating the peeled base material on the transparent film.

In the step S112, the transparent film 120 is laminated on the first side 101 of the release film 110, and the base material 112 at the first side 101 of the release film 110 is not discharged. Specifically, the base material 112 at the first side 101 of the release film 110 is firstly peeled off so that the viscous side of the surface material 111 at the first side 101 of the release film 110 is exposed, and then the non-viscous side of the transparent film 120 and the viscous side of the surface material 111 are bonded together such that the transparent film 120 is laminated with the surface material 111 of the release film, and finally the peeled base material 112 is bonded to the viscous side of the transparent film 120, thus the base material 112 of the release film is laminated with the transparent film 120.

The structure of the first side 101 finally becomes: the base material 112 of the release film, the transparent film 120, and the surface material 111 of the release film are sequentially laminated.

S113, removing the base material at the second side of the release film to expose the surface material, and laminating the adhesive on the surface material of the release film.

In the step S113, the self-adhesive 130 is laminated on the second side 102 of the release film 110, and the base material 112 of the second side 102 of the release film 110 is discharged. Specifically, the base material 112 of the second side 102 of the release film 110 is firstly peeled off and discharged so that the adhesive side of the surface material 111 of the second side 102 of the release film 110 is exposed, and then the surface of the base material 132 of the self-adhesive is bonded to the adhesive side of the surface material 111 of the release film so that the self-adhesive 132 is laminated with the surface material 111 of the release film.

The structure of the second side finally becomes: the surface material 131 of the adhesive, the base material 132 of the adhesive, and the surface material 111 of the release film are sequentially laminated.

Finally, the cladding material 100 as shown in FIG. 2 and FIG. 3 is manufactured, wherein the first side 10110 of the cladding material 100, that is, the structure shown on the left side of FIG. 3, is: the base material 112 of the release film, the transparent film 120 and the surface material 111 of the release film which are subsequently laminated from top to bottom; and the second side 102 of the cladding material 100, that is, the structure shown on the right side of FIG. 3, is: the surface material 131 of the adhesive, the base material 132 of the adhesive, and the surface material 111 of the release film which are sequentially laminated from top to bottom.

In the embodiment of the present invention, the order of the steps S112 and S113 is not limited, and the two steps may be reversed or may be performed simultaneously.

S12, die cutting the transparent film and the base material of the release film at the first side of the cladding material into a first label unit, and die cutting the adhesive at the second side of the cladding material into a second label unit, wherein the first label unit and the second label unit are symmetrically distributed along a reference line on the surface material of the release film.

Figure 6:
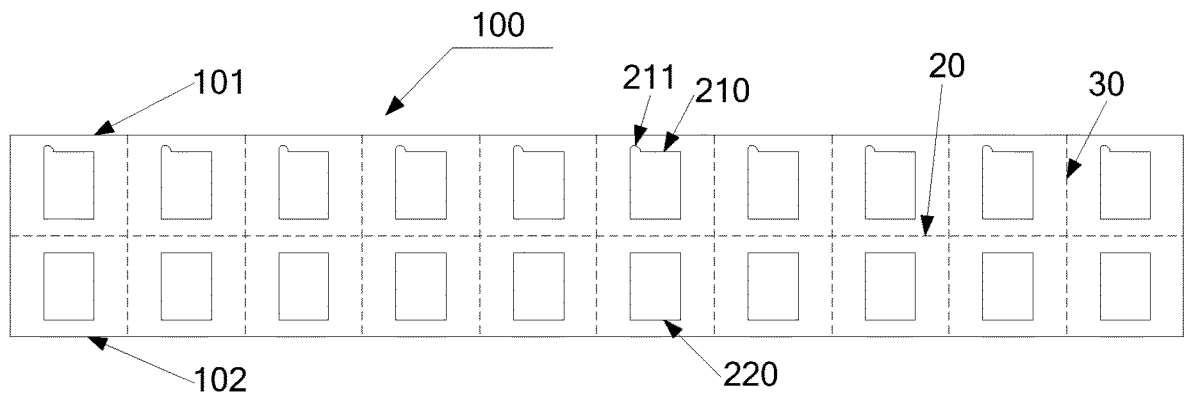
FIG. 6 is a schematic view of a cladding material after die cutting for a label in an embodiment of the present invention.

The step S12 is a label die cutting step. As shown in FIG. 6, the first side 101 and the second side 102 of the cladding material 100 are die cut respectively to form a first label unit 210 and a second label unit 220. The first label unit 210 and the second label unit 220 have the same body dimension, and the first label unit 210 and the second label unit 220 are symmetrically distributed along a reference line 20 on the surface material 111 of the release film (or the cladding material 100), wherein the reference line 20 can ensure that the first label unit 210 and the second label unit 220 can be accurately laminated together subsequently, and the reference line 20 is preferably the center line of the surface material 111 of the release film. The cladding material 100 in which the first label unit 210 and the second label unit 220 is obtained by die cutting is the self-laminating label of the embodiment of the present invention.

Specifically, the first side 101 of the cladding material 100 is die cut, and the transparent film 120 and the base material 112 of the release film are cut through, and then the remaining part of the transparent film 120 and the base material 112 of the release film which are bonded on the surface material 111 of the release film after die cutting forms the first label unit 210; and the second side 102 of the cladding material 100 is die cut, and the entire adhesive 130 (i.e., the surface material 131 and the base material 132 of the adhesive) is cut through, and the remaining part of the adhesive 130 bonded to the surface material 111 of the release film after die cutting forms the second label unit 220. Therefore, the first label unit 210 comprises the transparent film 120 and the base material 112 of the release film which are laminated together, and the second label unit 220 comprises the surface material 131 and the base material 132 of the adhesive which are laminated together. So far, the self-laminating label has been manufactured.

Further, a tear line can also be obtained by die cutting along the reference line 20 between the first label unit 210 and the second label unit 220 to ensure that the surface material 111 of the release film can be removed quickly and easily after subsequent label laminating.

Figure 7:
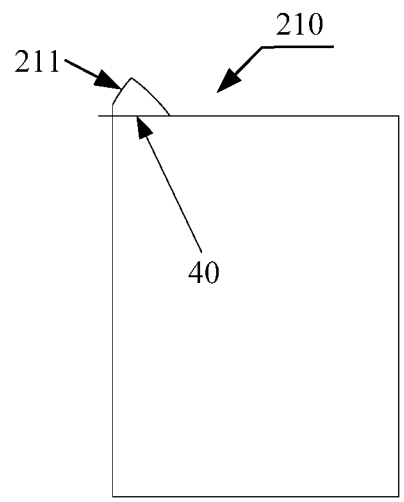
FIG. 7 is a schematic diagram of a first label unit in an embodiment of the present invention.

Further, as shown in FIG. 6 and FIG. 7, a pull bar 211 is also extended from the main body of the first label unit 210 and is located on the base material 112 of the release film of the first label unit 210 for quickly removing, during the subsequent label laminating, the base material 112 of the release film by pulling the pull bar 211. The pull bar 211 may be of any shape as long as it extends beyond the main body of the first label unit 210 to facilitate pulling.

Alternatively, the first label unit 210 having the pull bar 211 may be manufactured in the following manner:

First, the die cutting is performed from the surface of the base material 112 of the release film, and the transparent film 120 and the base material 112 of the release film at the first side 101 of the cladding material 100 are die cut into the first label unit 210 having the pull bar 211, wherein each of the transparent film 120 and the base material 112 of the release film of the first label unit 210 has the pull bar 211; and then, the die cutting is started from the surface of the surface material 111 of the release film (i.e., the other side of the release film 110) so that the transparent film 120 and the surface material 111 of the release film are cut through, and the pull bar 211 of the transparent film 120 of the first label unit 210 is cut off, and finally the pull bar 211 is only on the base material 112 of the release film.

Preferably, when cutting off the pull bar 211 of the transparent film, the pull bar 211 of the transparent film 120 of the first label unit 210 can be cut off from the root position of the pull bar 211. For example, cutting along a dashed line 40 as shown in FIG. 7, and the pull bar 211 on the transparent film 120 is immediately stripped off with only one slit is left on the surface material 111 of the release film, thereby preventing the transparent film 120 from being damaged in a subsequent process as a result of digging out a block from the surface material 111 of the release film.

Figure 8:
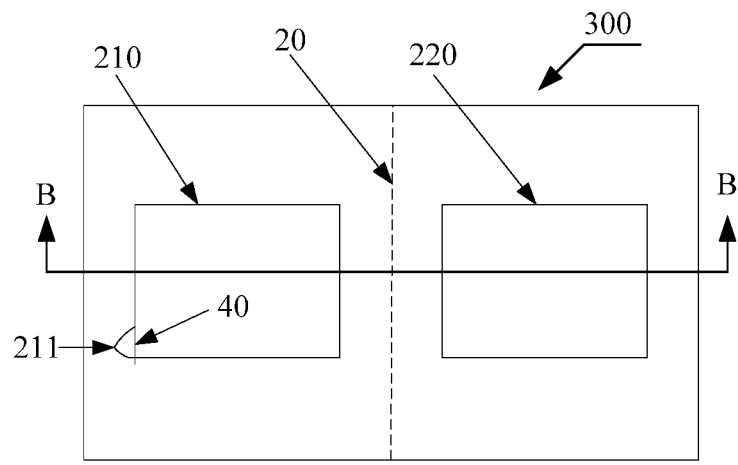
FIG. 8 is a schematic view of a self-laminating label according to an embodiment of the present invention.
Figure 9:
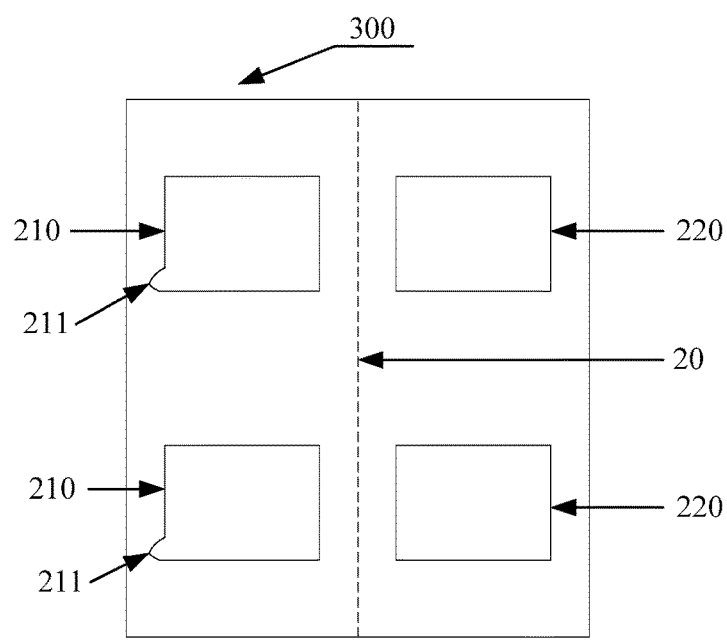
FIG. 9 is still another schematic view of the self-laminating label according to an embodiment of the present invention.

As shown in FIG. 6, in the embodiment, the first side 101 and second side 102 of the cladding material 100 are die cut into a plurality of (i.e., at least two) the first label units 210 and the second label units 220. Then, according to actual needs, the cladding material 100 is cut into multiple pieces (i.e., at least two) of small cladding material 100 along a dashed line 30 shown in FIG. 6, and each piece of the small cladding material 100 comprises at least one pair of the first label unit 210 and the second label unit 220 (i.e., one first label unit 210 and one second label unit 220 symmetrically distributed along the reference line), and each piece of the small cladding material 100 forms one self-laminating label. As shown in FIG. 8, a self-laminating label 300 has a pair of the first label unit 210 and the second label unit 220. As shown in FIG. 9, the self-laminating label 300 has two pairs of the first label unit 210 and the second label unit 220. Subsequently, each self-laminating label can be subjected to a label laminating operation, that is, the dimension of the release film 110 originally manufactured may be used to manufacture a plurality of the self-laminating labels 300.

In an alternative embodiment, the cladding material 100 after the label die cutting may not be divided, and the entire cladding material is used as the self-laminating label 300, and then the label laminating operation is performed to the cladding material 100 (the self-laminating label 300) after the entire label is die cut. That is to say, the dimension of the release film 110 originally manufactured can be used to manufacture only one self-laminating label.

In the label manufacturing method of the embodiment of the present invention, the cladding material 100 having different structures on both sides is manufactured firstly, and then the both sides of the cladding material 100 are respectively die cut into the first label unit 210 and the second label unit 220 symmetrically distributed along the reference line 20, wherein the first label unit 210 has a transparent film 120, and the second label unit 220 is the adhesive 130, thereby obtaining the self-laminating label 300. For the subsequent label laminating, it is only necessary to fold the self-laminating label 300 in half along the reference line 20 and make the two parts after the folding contact with each other. Since the first label unit 210 and the second label unit 220 are symmetrically distributed along the reference line 20, after the folding, the transparent film 120 of the first label unit 210 and the adhesive 130 of the second label unit 220 can be completely and accurately aligned and laminated together, and the entire laminating process is highly efficient and fast without the need of the special laminating device for the laminating operation and a special requirement of material size, thus reducing the device cost, the processing cost and the material selection cost, which greatly reduces the production cost of the label.

Figure 10:
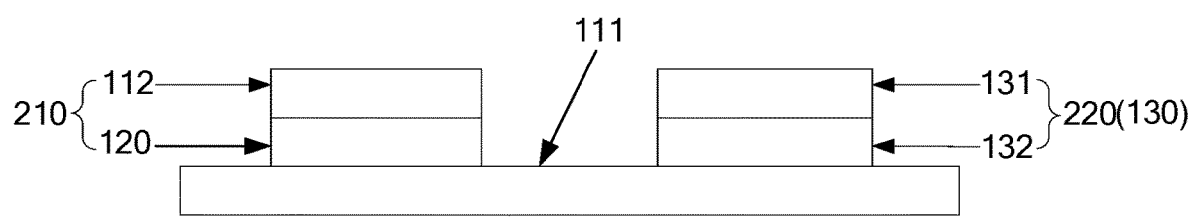
FIG. 10 is a cross-sectional view showing a first embodiment of the self-laminating label in the present invention (i.e., a cross-sectional view taken along line B-B in FIG. 8)

As shown in FIG. 8 to FIG. 10, in the first embodiment of the self-laminating label in the present invention, the self-laminating label is manufactured by the above-mentioned label manufacturing method, comprising the surface material 111 of the release film, and the first label unit 210 and the second label unit 220 which are laminated on the surface material 111 of the release film side by side and symmetrically distributed along the reference line 20 on the surface material 111 of the release film, wherein the first label unit 210 and second label unit 220 has the same body dimension, and the first label unit 210 comprises the base material 112 of the release film and the transparent film 120 which are sequentially laminated from top to bottom, and the second label unit 220 comprises the surface material 131 and the base material 132 of the adhesive which are sequentially laminated from top to bottom.

There is at least one pair of the first label unit 210 and the second label unit 220. The self-laminating label 300 as shown in FIG. 8 has a pair of the first label unit 210 and the second label unit 220. The self-laminating label 300 as shown in FIG. 9 has two pairs of the first label units 210 and the second label units 220. In other examples, there may be multiple pairs of the first label units 210 and the second label units 220, which are not limited by the present invention.

Further, the reference line 20 is the tear line. Make sure that it is convenient and fast to remove the surface material 111 of the release film after the subsequent label laminating. Further, the reference line 20 is the center line of the surface material 111 of the release film.

Further, the base material 112 of the release film of the first label unit 210 has the pull bar 211 for facilitating removal of the base material 112 of the release film by pulling the pull bar 211 during the subsequent label laminating. The pull bar 211 may be of any shape as long as it extends from the main body of the first label unit 210 to facilitate the pulling.

In the self-laminating label 300 of the embodiment of the present invention, the first label unit 210 and the second label unit 220 on the surface material 111 of the release film are symmetrically distributed along the reference line 20, and the transparent film 120 is disposed on the first label unit 210, and the second label unit 220 is the adhesive 130.

Therefore, during the subsequent label laminating, the transparent label 120 on the first label unit 210 can be completely and accurately aligned and laminated on the adhesive 130 of the second label 220 by simply folding the self-laminating label 300 in half along the reference line 20 and making the two parts after the folding contact with each other, and the entire laminating process is highly efficient and fast without the need of the special laminating device for the laminating operation and the special requirement of material size, thus reducing the device cost, the processing cost and the material selection cost, which greatly reduces the production cost of the label.

Second Embodiment

Referring to FIG. 11, the second embodiment of the label manufacturing method of the present invention is proposed. The label manufactured in this embodiment is a self-laminating label, and the method comprises the following steps:

S21, manufacturing adhesive, a release film, and a transparent film into a cladding material, wherein a first side of the cladding material comprises a base material of the release film, the transparent film and a surface material of the release film which are sequentially laminated, and a second side of the cladding material comprises adhesive and the surface material of the release film which are sequentially laminated.

S22, die cutting the transparent film and the base material of the release film at the first side of the cladding material into a first label unit, and die cutting a surface material of the adhesive at the second side of the cladding material into a second label unit, wherein the first label unit and the second label unit are symmetrically distributed along a reference line on the surface material of the release film.

The difference between this embodiment and the first embodiment lies in a slight difference in step S22.

In the step S22, when a second label unit 220 is die cut, only a surface material 131 of the adhesive at second side 102 of a cladding material 100 is die cut into the second label unit 220, that is, only the surface 131 of the adhesive is cut through, but a base material 132 of the adhesive is not cut, and then the remaining part of the surface material 131 of the adhesive which is bonded to the base material 132 of the adhesive and a surface film 111 of the release film after die cutting forms the second label unit 220. Therefore, the second label unit in this embodiment comprises only the surface material 131 of the adhesive, and does not comprise the base material 132 of the adhesive.

As shown in FIG. 8, FIG. 9, and FIG. 12, in the second embodiment of the self-laminating label of the present invention, the self-laminating label 300 is manufactured by the above-mentioned label manufacturing method. The difference between this embodiment and the first embodiment lies in the second label unit 220. As shown in FIG. 12, the second label unit 220 comprises only the surface material 131 of the adhesive, and there is also the base material 132 of the adhesive between the second label unit 220 (i.e., the surface material 131 of the adhesive) and the surface material 111 of the release film.

In this embodiment, since the second label unit 220 comprises only the surface material 131 of the adhesive, the second label unit 220 is actually laminated on the base material 132 of the adhesive without the die cutting, and when the label laminating is subsequently performed to manufacture the sticker, since the area of the surface material 111 of the release film and the base material 132 of the adhesive is larger than the area of the transparent film 120 of the sticker and the surface material 131 of the adhesive, it is very easy to peel off the surface material 111 of the release film and the base material 132 of the adhesive from the sticker, which makes the sticker be more convenient and quicker to use, and avoids the inconvenience of subsequent use caused by peeling off the base material 132 of the adhesive.

Third Embodiment

Referring to FIG. 13, the third embodiment of the label manufacturing method of the present invention is proposed. The label manufactured in this embodiment is a finished sticker. The method comprises the following steps:

S31, manufacturing adhesive, a release film and a transparent film into a cladding material, wherein a first side of the cladding material comprises a base material of the release film, the transparent film and a surface material of the release film which are sequentially laminated, and a second side of the cladding material comprises the adhesive and the surface material of the release film which are sequentially laminated.

S32, die cutting the base material of the release film and the transparent film at the first side of the cladding material into a first label unit, and die cutting the adhesive at the second side of the cladding material into a second label unit, wherein the first label unit and the second label unit are symmetrically distributed along a reference line on the surface material of the release film.

In the embodiment of the present invention, the steps S31 and S32 are the same as the steps S11 and S12 in the first embodiment, and details are not described herein again.

S33, removing the base material of the release film of the first label unit, folding the cladding material in half along the reference line to laminate the first label unit and the second label unit, and removing the surface material of the release film.

In this embodiment, after a label die cutting step is completed, the label may be printed, that is, printing is carried out on the surface (i.e., the surface of a surface material 131) of adhesive 130 of a second label unit 220 of a cladding material 100 (i.e., a self-laminating label 300), including ink-jet printing, laser printing, etc.

When the printing is completed, a label laminating step is performed, and the difference between a conventional label laminating step and that in the embodiment of the present invention lies in that a transparent film 120 coating the label (i.e., the adhesive 130 which is made into the second label unit 220) in the embodiment has been manufactured into the label (i.e., the first label unit 210), and both have the same dimension and are symmetrically distributed with respect to a reference line 20 of a surface material 111 of the release film. Therefore, the two can be quickly and accurately laminated together.

Specifically, a base material 112 of the release film of the first label unit 210 is first peeled off and discharged, and since the base material 112 of the release film has a pull bar 211, it is very easy to be peeled off. The cladding material 100 is then folded in half along the reference line 20 such that the transparent film 120 of the first label unit 210 and the adhesive 130 of the second label unit 220 are bonded together, thereby causing the first label unit 210 and the second label unit 220 to be laminated together. Since the first label unit 210 and the second label unit 220 are symmetrically distributed along the reference line 20, in particular, a tear line is obtained by die cutting along the reference line 20, it is very easy to fold in half and make the first label unit 210 and the second label unit 220 be completely and accurately aligned and laminated, which results in high manufacturing efficiency and a low reject rate.

Finally, the surface material 112 of the release film is peeled off and discharged, and a sticker 200 as shown in FIG. 14 and FIG. 15 is formed, wherein the sticker 200 comprises the transparent film 120 and the surface material 131 of the adhesive and a base material 132 of the adhesive which are sequentially laminated. Since the area of the surface material 112 of the release film is larger than the area of the transparent film 120 and the adhesive 130 of the sticker 200, it is very easy to peel off the surface material 112 of the release film from the sticker 100.

In the label manufacturing method of the embodiment of the present invention, the cladding material 100 having different structures on both sides is manufactured firstly, and then the both sides of the cladding material 100 are respectively die cut into the first label unit 210 and the second label unit 220 symmetrically distributed along the reference line 20. Finally, in a laminating operation, it is only necessary to fold the cladding material 100 in half along the reference line 20 and make the two parts after the folding contact with each other. Since the first label unit 210 and the second label unit 220 are symmetrically distributed along the reference line, after the folding, the transparent film 120 of the first label unit 210 and the adhesive 130 of the second label unit 220 can be completely and accurately aligned and laminated together, and the entire laminating process is highly efficient and fast without the need of a special laminating device for the laminating operation and a special requirement of material size, thus reducing the device cost, the processing cost and the material selection cost, which greatly reduces the production cost of the label 200.

Fourth Embodiment

Referring to FIG. 16, the fourth embodiment of the label manufacturing method of the present invention is proposed. The label manufactured in this embodiment is a finished sticker. The method comprises the following steps:

S41, manufacturing adhesive, a release film and a transparent film into a cladding material, wherein a first side of the cladding material comprises a base material of the release film, the transparent film and a surface material of the release film which are sequentially laminated, and a second side of the cladding material comprises adhesive and the surface material of the release film which are sequentially laminated.

S42, die cutting the transparent film and the base material of the release film at the first side of the cladding material into a first label unit, and die cutting the surface material of the adhesive of the second side of the cladding material into a second label unit, wherein the first label unit and the second label unit are symmetrically distributed along a reference line on the surface material of the release film.

S43, removing the base material of the release film of the first label unit, folding the cladding material in half along the reference line to laminate the first label unit and the second label unit, and removing the surface material of the release film and the base material of the adhesive.

The difference between this embodiment and the third embodiment lies in that the steps S42 and S43 are slightly different.

In the step S42, when a second label unit 220 is die cut, only a surface material 131 of the adhesive at a second side 102 of a cladding material 100 is die cute into a second label unit 220, that is, only the surface material 131 of the adhesive is cut through, but a base material 132 of the adhesive is not cut, and then the remaining part of the surface material of 131 the adhesive adhered to the base material 132 of the adhesive and a surface material 111 of the release film after die cutting forms the second label unit 220. Therefore, the second label unit in this embodiment comprises only the surface material 131 of the adhesive, and does not comprise the base material 132 of the adhesive.

In the step S43, when a first label unit 210 and the second label unit 220 are laminated, the surface material 111 of the release film and the base material 132 of the adhesive are peeled off and discharged at the same time, so that the finished sticker 200 is a label in which the base material 132 of the adhesive is removed and includes only a transparent film 120 and the surface material 131 of the adhesive which are laminated together.

The base material 132 of the adhesive is removed to expose a viscous side of the surface material 131 of the adhesive, so that the label 200 can be directly attached to a designated article. For example, the label 200 is directly attached to a product, or the label 200 is attached to a temporary article which has a larger area and is easy to be removed.

In this embodiment, since the second label unit 220 comprises only the surface material 131 of the adhesive, the second label unit 220 is actually laminated on the base material 132 of the adhesive without die cutting. Since the area of the surface material 111 of the release film and the base material 132 of the adhesive is larger than the area of a transparent film 120 of the sticker 200 and the surface material 131 of the adhesive, it is very easy to peel off the surface material 111 of the release film and the base material 132 of the adhesive from the sticker 200, which makes the sticker more convenient and quicker to use, and avoids the inconvenience of a subsequent use caused by peeling off the base material 132 of the adhesive.

In the embodiment of the present invention, in addition to the adhesive and the transparent film, the sticker can be added with other materials as needed. Accordingly, it is necessary to add other materials when manufacturing the cladding material and the manufactured self-laminating label also contains said other materials. Said other materials, such as an anti-counterfeiting material, may of course contain any necessary material. It is exemplified by the anti-counterfeiting material in the following.

Fifth Embodiment

Referring to FIG. 17, the fifth embodiment of the label manufacturing method of the present invention is proposed. The label manufactured in this embodiment is a self-laminating label, and the method comprises the following steps:

S51, manufacturing adhesive, a release film, a transparent film and an anti-counterfeiting material into a cladding material, wherein a first side of the cladding material comprises a base material of the release film, the transparent film, the anti-counterfeiting material and a surface material of the release film which are sequentially laminated, and a second side of the cladding material comprises the adhesive and the surface material of the release film which are sequentially laminated.

S52, die cutting the base material of the release film, the transparent film and the anti-counterfeiting material at the first side of the cladding material into a first label unit, die cutting a surface material of the adhesive at the second side of the cladding material into a second label unit, wherein the first label unit and the second label unit are symmetrically distributed along a reference line on the surface material of the release film.

The difference between this embodiment and the second embodiment lies in that a layer of the anti-counterfeiting material is added between the transparent film 120 and a surface material 111 of the release film. Therefore, the difference between the self-laminating label manufactured in this embodiment and the second embodiment lies in that the first label unit 220 is different, wherein the first label unit herein comprises the base material of the release film, the transparent film and the anti-counterfeiting material which are sequentially laminated.

Accordingly, the laminating step after the step S52 is the same as that of the fourth embodiment, but the finished sticker adds a layer of the anti-counterfeit material compared to the fourth embodiment, that is, the sticker comprises the anti-counterfeiting material, the transparent film 120 and the a surface material 131 of the adhesive which are subsequently laminated.

In an alternative embodiment, in the step S52, when manufacturing the second label unit 220, like in the first embodiment, the entire adhesive 130 (i.e., the surface material 131 and the base material 132 of the adhesive) may be die cut into the second label unit 220. Here, the manufactured self-laminating label is different from that of the first embodiment in the first label unit, and the first label unit comprises the base material of the release film, the transparent film, and the anti-counterfeit material which are sequentially laminated.

Accordingly, the laminating step after the step S52 is the same as that of the third embodiment, but the finished sticker adds a layer of the anti-counterfeiting material compared to the third embodiment, that is, the sticker comprises the anti-counterfeiting material, the transparent film 120, the surface material 131 of the adhesive and the base material 132 of the adhesive which are sequentially laminated.

In some embodiments, the laminating order of the transparent film 120 and the anti-counterfeiting material may also be exchanged, namely:

The first side of the cladding material comprises the base material 112 of the release film, the anti-counterfeiting material, the transparent film 120 and the surface material 111 of the release film which are sequentially laminated;

The first label unit of the self-laminating label comprises the base material 112 of the release film, the anti-counterfeiting material and the transparent film 120 which are sequentially laminated;

The sticker comprises the transparent film 120, the anti-counterfeit material, the surface material 131 of the adhesive, and the base material 132 of the adhesive (or the base material 132 of the adhesive is omitted) which are sequentially laminated.

In the embodiment of the present invention, when manufacturing the cladding material, in addition to being divided into two sides which are side by side, three sides or more which are side by side may also be used. For the same reason, it is within the protection scope of the present invention. It is exemplified by dividing into three sides which are side by side in the following.

Sixth Embodiment

Referring to FIG. 18, the sixth embodiment of the label manufacturing method of the present invention is proposed. The label manufactured in this embodiment is a self-laminating label, and the method comprises the following steps:

S61, manufacturing adhesive, a release film, a transparent film and an anti-counterfeiting material into a cladding material, wherein a first side of the cladding material comprises a base material of the release film, a transparent film and a surface material of the release film which are subsequently laminated, and a second side of the cladding material comprises the adhesive and the surface material of the release film which are sequentially laminated, and a third side of the cladding material comprises the anti-counterfeit material and the surface material of the release film which are sequentially laminated.

S62, die cutting the transparent film and the base material of the release film at the first side of the cladding material into a first label unit, die cutting the surface material of the adhesive at the second side of the cladding material into a second label unit, and die cutting the anti-counterfeiting material at the third side of the cladding material into a third label unit, wherein the first label unit and the second label unit are symmetrically distributed along a first reference line on the surface material of the release film, and the second label unit and the third label unit are symmetrically distributed along a second reference line on the surface material of the release film.

The difference between this embodiment and the second embodiment lies in that the third side adjacent to the second side is added to the cladding material, and the third side comprises the anti-counterfeit material and a surface material 111 of the release film which are sequentially laminated. Here, the difference between the self-laminating label manufactured in this embodiment and that of the second embodiment lies in that the third label unit which is the anti-counterfeit material is added, and a first label unit 210, a second label unit 220 and the third label unit are arranged side by side, wherein the first label unit 210 and the second label unit 220 are symmetrically distributed along a first reference line on the surface material 111 of the release film, and the second label unit 220 and the third label unit are symmetrically distributed along a second reference line on the surface material 111 of the release film.

Accordingly, the laminating step after the step S62 is:

A base material 112 of the release film of the first label unit 210 is removed, and a cladding material 100 is folded in half along the first reference line, so that the first label unit 210 and the second label unit 220 are laminated together, and the surface material 111 of the release film that is laminated on the first label unit 210 is peeled off; and then, the cladding material 100 is folded in half along the second reference line to cause the third label unit and the first label unit 210 and the second label unit 220 to be laminated together, and finally the surface material 111 of the release film and the base material 112 of the adhesive are removed. The finished sticker adds a layer of the anti-counterfeit material compared to the fourth embodiment, that is, the sticker comprises the anti-counterfeit material, a transparent film 120 and a surface material 131 of the adhesive which are sequentially laminated.

In an alternative embodiment, in the step S62, when manufacturing the second label unit 220, as in the first embodiment, the entire adhesive 130 (i.e., the surface material 131 and the base material 132 of the adhesive) may be die cut into the second label unit 220. Here, the manufactured self-laminating label is different from that of the first embodiment in that a third label unit is added, wherein the third label unit is an anti-counterfeit material, and the first label unit 210, the second label unit 220, and the third label unit are arranged side by side, wherein the first label unit 210 and the second label unit 220 are symmetrically distributed along a first reference line on the surface material 111 of the release film, and the second label unit 220 and the third label unit are symmetrically distributed along a second reference line on the surface material 111 of the release film.

Accordingly, the laminating step after the step S62 is:

The base material 112 of the release film of the first label unit 210 is removed, and the cladding material 100 is folded in half along the first reference line, so that the first label unit 210 and the second label unit 220 are laminated together, and the surface material 111 of the release film that is laminated on the first label unit 210 is peeled off; and then, the cladding material 100 is folded in half along the second reference line to cause the third label unit and the first label unit 210 and the second label unit 220 to be laminated together, and finally the surface material 111 of the release film is removed. The finished sticker adds a layer of the anti-counterfeit material compared to the fourth embodiment, that is, the sticker comprises the anti-counterfeit material, the transparent film 120 and the surface material 131 of the adhesive and the base material 132 of the adhesive which are sequentially laminated.

In some embodiments, the laminating order of the transparent film 120 and the anti-counterfeit material can also be exchanged, namely:

In the film laminating step, the cladding material 100 is folded in half along the second reference line to laminate the third label unit and the second label unit 210, and the surface material 111 of the release film laminated on the second label unit 210 is peeled off; and then the base material 112 of the release film of the first label unit 210 is removed, and the cladding material 100 is folded in half along the first reference line to laminate the first label unit 210 and the third label unit together, and the surface material 111 of the release film is finally removed. The finished sticker adds a layer of the anti-counterfeit material compared to the fourth embodiment, that is, the sticker comprises the transparent film 120, the anti-counterfeiting material, the surface material 131 of the adhesive and the base material 132 of the adhesive which are subsequently laminated.

It should be understood that the above is only preferred embodiments of the present invention, and thus the scope of the present invention is not limited thereto, and the equivalent structure or equivalent process transformations made by utilizing the description and the drawings of the present invention and used directly or indirectly in the other related technical field are equally within the protection scope of the present invention.

INDUSTRIAL APPLICABILITY

In the label manufacturing method provided by the embodiments of the present invention, the cladding material having different structures on both sides is manufactured firstly, and then the both sides of the cladding material are respectively die cut to form the first label unit and the second label unit symmetrically distributed along the reference line on the surface material of the release film, wherein the first label unit has the transparent film, and the second label unit is the adhesive, thereby obtaining the self-laminating label, and only folding the self-laminating label in half along the reference line and making the two parts after the folding contact with each other are needed when the label laminating is carried out subsequently. Since the first label unit and the second label unit are symmetrically distributed along the reference line, the transparent film of the first label unit and the adhesive of the second label unit after the folding can be completely and accurately aligned and laminated, and the entire laminating process is highly efficient and fast without the need of the special laminating device for the laminating operation and the special requirement of material size, thus reducing the device cost, the processing cost and the material selection cost, which greatly reduces the production cost of the label. Therefore, the technical solution herein is industrially applicable.

What is claimed is:

1. A self-laminating label, comprising:
a surface material of a release film having a viscous side, and
a first label unit and a second label unit which are arranged on the surface material of the release film side by side and symmetrically distributed along a reference line on the surface material of the release film,
wherein the first label unit comprises a base material of the release film and a transparent film having a viscous side and a non-viscous side, the non-viscous side of the transparent film and the viscous side of the surface material of the release film are bonded together such that the transparent film is laminated with the surface material of the release film, and the base material of the release film is bonded to the viscous side of the transparent film such that the base material of the release film is laminated with the transparent film, and
the second label unit comprises:
a surface material of a sticker having a viscous side, and
a base material of the sticker having a first side and a second side, wherein the viscous side of the surface material of the sticker is bonded to the first side of the base material of the sticker such that the surface material of the sticker is laminated with the base material of the sticker, and the second side of the base material of the sticker is bonded to the viscous side of the surface material of the release film such that the base material of the sticker is laminated with the surface material of the release film.

2. The self-laminating label according to claim 1, wherein the reference line is a tear line.

3. The self-laminating label according to claim 1, wherein the reference line is a center line on the surface material of the release film.

4. The self-laminating label according to claim 1, wherein the release film of the first label unit has a pull bar on the base material.

5. The self-laminating label according to claim 1, wherein the surface material of the release film comprises a first portion and a second portion, the first portion and the first label unit both being on a first side of the reference line, and the second portion and the second label unit both being on a second side of the reference line opposing the first side; and
an area of the first portion is greater than an area of the first label unit, an area of the second portion is greater than an area of the second label unit, and the area of the first label unit is equal to the area of the second label unit.

* * * * *